(12) United States Patent  (10) Patent No.: US 8,432,458 B2
Hirooka  (45) Date of Patent: Apr. 30, 2013

(54) IMAGING APPARATUS INCORPORATING WIDE DYNAMIC RANGING

(75) Inventor: Shinichiro Hirooka, Fujisawa (JP)

(73) Assignee: Hitachi, Ltd., Tokyo (JP)

(*) Notice: Subject to any disclaimer, the term of this patent is extended or adjusted under 35 U.S.C. 154(b) by 660 days.

(21) Appl. No.: 12/500,850

(22) Filed: Jul. 10, 2009

(65) Prior Publication Data

US 2010/0020194 A1  Jan. 28, 2010

(30) Foreign Application Priority Data

Jul. 23, 2008 (JP) ................................. 2008-189278

(51) Int. Cl.
*H04N 5/228* (2006.01)
*H04N 7/18* (2006.01)

(52) U.S. Cl.
USPC ...... 348/222.1; 348/135; 348/254; 348/221.1

(58) Field of Classification Search ............... 348/229.1, 348/208.14, 169, 135, 222.1, 254
See application file for complete search history.

(56) References Cited

U.S. PATENT DOCUMENTS

| | | | |
|---|---|---|---|
| 5,144,442 A * | 9/1992 | Ginosar et al. ............. | 348/222.1 |
| 2005/0275747 A1* | 12/2005 | Nayar et al. ................ | 348/362 |
| 2007/0103562 A1* | 5/2007 | Kaneko et al. ............. | 348/222.1 |
| 2007/0132858 A1* | 6/2007 | Chiba et al. ................ | 348/222.1 |
| 2007/0177050 A1* | 8/2007 | Xiao et al. .................. | 348/371 |

FOREIGN PATENT DOCUMENTS

| | | |
|---|---|---|
| JP | 2000-276599 | * 10/2000 |
| JP | 2003-219281 | * 7/2003 |
| JP | 2003-319250 | 11/2003 |
| JP | 2004-297701 | 10/2004 |
| JP | 2005-005893 | 1/2005 |
| JP | 2005-065119 | 3/2005 |
| JP | 2005-303595 | * 10/2005 |
| JP | 2006-301172 | 11/2006 |
| JP | 2007-180892 | 7/2007 |
| JP | 2007-251905 | 9/2007 |
| JP | 2007-288805 | 11/2007 |
| JP | 2008-035415 | 2/2008 |
| JP | 2008-048251 | 2/2008 |
| JP | 2008-070562 | 3/2008 |
| JP | 2008-099038 | 4/2008 |

* cited by examiner

*Primary Examiner* — Hung Lam
(74) *Attorney, Agent, or Firm* — Antonelli, Terry, Stout & Kraus, LLP.

(57) ABSTRACT

An imaging apparatus having a wide dynamic range, including an imaging unit, an exposure control unit realizing a plurality of the imaging processes on the same object with different sensitivities by controlling the exposure of the imaging unit, a camera signal processing unit generating a video signal by processing the camera signal from the imaging unit, a video synthesis unit synthesizing a plurality of video signals having different sensitivities generated by the processing unit, and an object recognition unit processing the video signals from the processing unit and detecting the object information. The object recognition unit detects the object information for each of the plurality of the video signals. Based on the detected object information, the control unit controls the exposure, the processing unit controls the gamma characteristic of the video signals, and the synthesis unit controls the ratio for synthesizing the plurality of the video signals.

20 Claims, 9 Drawing Sheets

PERSON IN BOTH LOW - AND HIGH - ILLUMINANCE REGIONS

FIG.4B

PERSON ONLY IN HIGH - ILLUMINANCE REGION

FACE SELECTED AS OBJECT

FIG.7B

OBJECT SELECTION SCREEN

FIG.7C

WHOLE BODY IMAGE SELECTED AS OBJECT

OBJECT INFORMATION NOT ADDED

FIG.9B

OBJECT INFORMATION ADDED

IMAGING APPARATUS INCORPORATING WIDE DYNAMIC RANGING

INCORPORATION BY REFERENCE

The present application claims priority from Japanese application JP2008-189278 filed on Jul. 23, 2008, the content of which is hereby incorporated by reference into this application.

BACKGROUND OF THE INVENTION

This invention relates to an imaging apparatus having the function to secure a wide dynamic range in the imaging operation and thus capable of picking up an image of a scene large in dynamic range.

One example of the conventional technique in the background of this invention is disclosed in JP-A-2007-288805. The technique disclosed in this publication is intended to "achieve the optimum AE (automatic exposure control) in both the high-brightness object imaging operation and the low-brightness object imaging operation". This technique discloses a solving means in which "two imaging operations including the high-brightness object imaging operation and the low-brightness object imaging operation are performed and the resulting two images are synthesized and output. Also, the exposure processing unit 6B of the DSP (digital signal processor) 6 includes a switch 7C to switch the signal path for the long-time exposure and the short-time exposure, a long-time exposure signal processing unit 7A to process the signal for long-time exposure, a short-time exposure signal processing unit 7B to process the signal for short-time exposure, and a synthesis unit (MIX) 7D to synthesize the signals of the exposure processing units 7A, 7B. In the OPDs (optical detection circuits) 18A, 18B included in the exposure signal processing units 7A, 7B, respectively, the brightness distribution is determined for the long-time exposure and the short-time exposure independently of each other thereby to control the exposure amount optimally".

SUMMARY OF THE INVENTION

In the case where an image is picked up with a digital video camera or a still camera, an excessively high contrast in an intended scene may cause the phenomenon of the loss-of-detail in the lowlight due to an insufficient amount of light received by the sensor or the phenomenon of the highlight saturation with white due to the saturation of the amount of light received by the sensor in a part of the scene. As a means to solve this problem, a method of generating an image with a wide dynamic range is available in which the exposure condition is switched in such a manner that an image of an object low in illuminance is picked up with high sensitivity and an image of an object high in illuminance with low sensitivity, and both images are synthesized at a specified ratio. In JP-A-2007-288805 described above, for example, the imaging operation with a wide dynamic range is realized appropriately by controlling the exposure for high-sensitivity imaging and the exposure for low-sensitivity imaging based on the brightness distribution information acquired by an optical detection circuit from the respective imaging signals.

The method described in JP-A-2007-288805, however, fails to take what the object is into consideration. In a monitor application in which it is often desired to closely watch the face and the clothing of a person picked up as an image, for example, if the face and the clothing are narrower in brightness distribution than that of the background, then the background may consume more gradations than necessary and a sufficient gradation may not be secured for the face and the clothing, resulting in the loss of the detail.

In view of this, an object of the invention is to provide an image apparatus having a wide dynamic range realized by synthesizing a plurality of picked-up images with different sensitivities, wherein in addition to the brightness distribution information, a specified object such as the face of a person is detected, and by utilizing this detection result, the exposure is controlled to enlarge the gradations of the object intended by the user in priority. Further, the detection results of each picked-up image are integrated to control the signal processing for each image and also control the ratio at which the images are synthesized. As a result, the dynamic range is enlarged, while at the same time improving the visibility of the object intended by the user.

The object described above is achieved, for example, by the invention described in the appended claims.

According to this invention, the dynamic range of the digital video camera and the still camera is enlarged on the one hand, and the visibility of the object intended by the user is improved on the other hand.

Other objects, features and advantages of the invention will become apparent from the following description of the embodiments of the invention taken in conjunction with the accompanying drawings.

DETAILED DESCRIPTION OF THE EMBODIMENTS

Embodiments of the invention are explained below with reference to the accompanying drawings.

First Embodiment

Figure 1:
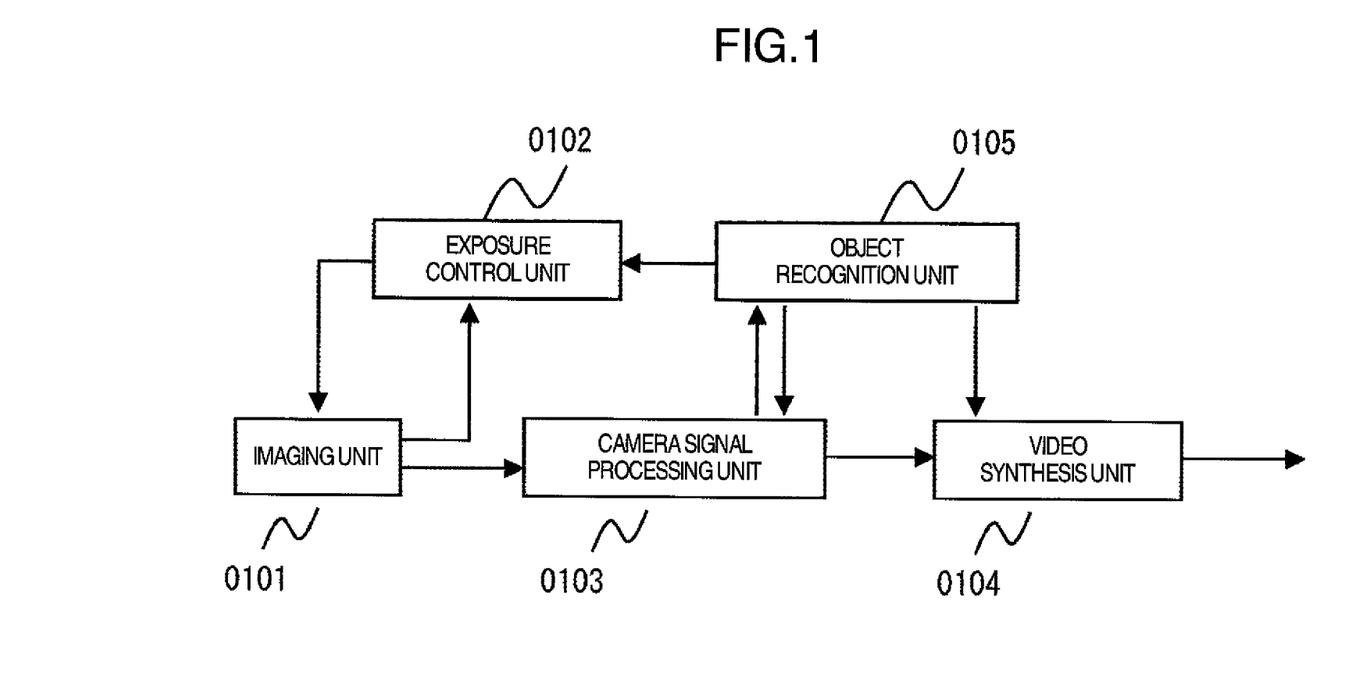
FIG. 1 is a first schematic diagram showing an imaging apparatus according to a first embodiment of the invention.

FIG. 1 is a first schematic diagram showing an imaging apparatus according to a first embodiment of the invention. In FIG. 1, reference numeral 0101 designates an imaging unit, numeral 0102 an exposure control unit, numeral 0103 a camera signal processing unit, numeral 0104 a video synthesis unit and numeral 0105 an object recognition unit.

In the imaging apparatus shown in FIG. 1, the imaging unit 0101 is configured of a group of lenses including a zoom lens and a focus lens, an iris, a shutter, an image sensor such as a CCD or a CMOS, a CDS or an AGC and an AD converter. The optical image received as light by the image sensor is output as an electrical signal by photoelectric conversion. The exposure control unit 0102 acquires the brightness distribution information from the signal output from the imaging unit 0101, and a target exposure is determined based on the brightness distribution information and the object information output from an object recognition unit 0105 described later. In this way, the reduction of the iris, the shutter timing and the AGC gain amount are controlled in such a manner that the actual exposure may approach the target exposure. In the process, by switching the target exposure at predetermined time intervals, the imaging operation with different sensitivities is made possible for each predetermined time. For example, the shutter is released at faster timing than normal for a given exposure period and at slower timing than normal for the next exposure period. This alternate exposure control operation makes it possible to alternate between the high-sensitivity imaging operation capable of picking up an object image of low illuminance in priority and the low-sensitivity imaging operation capable of picking up an object image of high illuminance in priority. To facilitate the understanding, a case is explained above in which a plurality of imaging operations with different sensitivities are performed by alternating between the high-sensitivity imaging operation intended for an object low in illuminance and the low-sensitivity imaging operation intended for an object high in illuminance. Nevertheless, this is only an example, and the shutter timing faster than normal and the shutter timing slower than normal may not necessarily be combined with each other. Also, the exposure control operation can of course be performed by switching three or more different sensitivities for each exposure period. Further, the exposure control operation may be changed not for each imaging period, but a different exposure control operation may be performed only at a specified timing. The camera signal processing unit 0103 executes, on the signal output from the imaging unit 0101, various signal processing such as the separation between the brightness signal and the color signal, the brightness correction process, the gamma process, the color difference conversion process, the white balance correction process and the digital zoom operation. The camera signal processing unit 0103 thus generates the video signal and outputs it to the synthesis processing unit 0104 and the object recognition unit 0105. The coefficients such as the brightness correction amount and the gamma characteristic used for each signal processing operation may be set and stored beforehand in the EEPROM or the like, or the control value may be changed based on the various information such as the image brightness distribution and the object information output from the object recognition unit 0105 described later. Also, by using different coefficients for a plurality of exposed images having different sensitivities, the appropriate signal processing can be executed for each exposed image. The video synthesis unit 0104 synthesizes, at a predetermined ratio, the video signals of different exposure periods output from the camera signal processing unit 0103, and outputs a synthesized image to a video display unit, a recording unit, a dynamic image compression unit and a PC not shown. To realize this configuration, for example, the video signal for a given exposure period is accumulated in a memory such as SDRAM, so that the video signal for the particular exposure period read from the memory and the video signal for another exposure period may be weighted and added to each other. By repeating this adding process, an arbitrary number of video signals having different sensitivities can be synthesized. Thus, a wide dynamic range can be realized in which the images of all the objects low and high in illuminance can be picked up without loosing contrast. In the process, the ratio at which the video signals are synthesized can be determined based on the sensitivity difference between the video signals, the information on the brightness distribution of the object in each video signal or the object information output from the object recognition unit 0105 described later. Also, the video signal may be output as it is without the synthesis process. The object recognition unit 0105 recognizes the image output from the camera signal processing unit 0103, and by detecting a specified object, outputs the object information including the quantity of the objects, the position of each object in the image, the brightness distribution information, the color information and the reliability of each object. Any object such as a face, a person or a moving object may be involved which can be detected by using a known image recognition technique. Using this object information, the exposure control unit 0102 can change by controlling the target exposure of the imaging unit, the camera signal processing unit 0103 the gamma characteristic, the video synthesis unit 0104 the ratio at which the images are synthesized. In this way, an image having a wide dynamic range optimized for the specified object can be generated. In the example described above, a plurality of picked-up images having different sensitivities are synthesized after being processed as the camera signals. Nevertheless, the picked-up images having different sensitivities may be processed in reverse order, i.e. first synthesized and then subjected to the camera signal processing such as the gamma characteristic control. Incidentally, the exposure control process by the exposure control unit 0102, the camera signal processing by the camera signal processing unit 0103, the video synthesis process by the video synthesis unit 0104 and the object recognition process by the object recognition unit 0105 are normally executed by a microcomputer, a DSP for the camera signal processing or a dedicated LSI in the camera.

Figure 2:
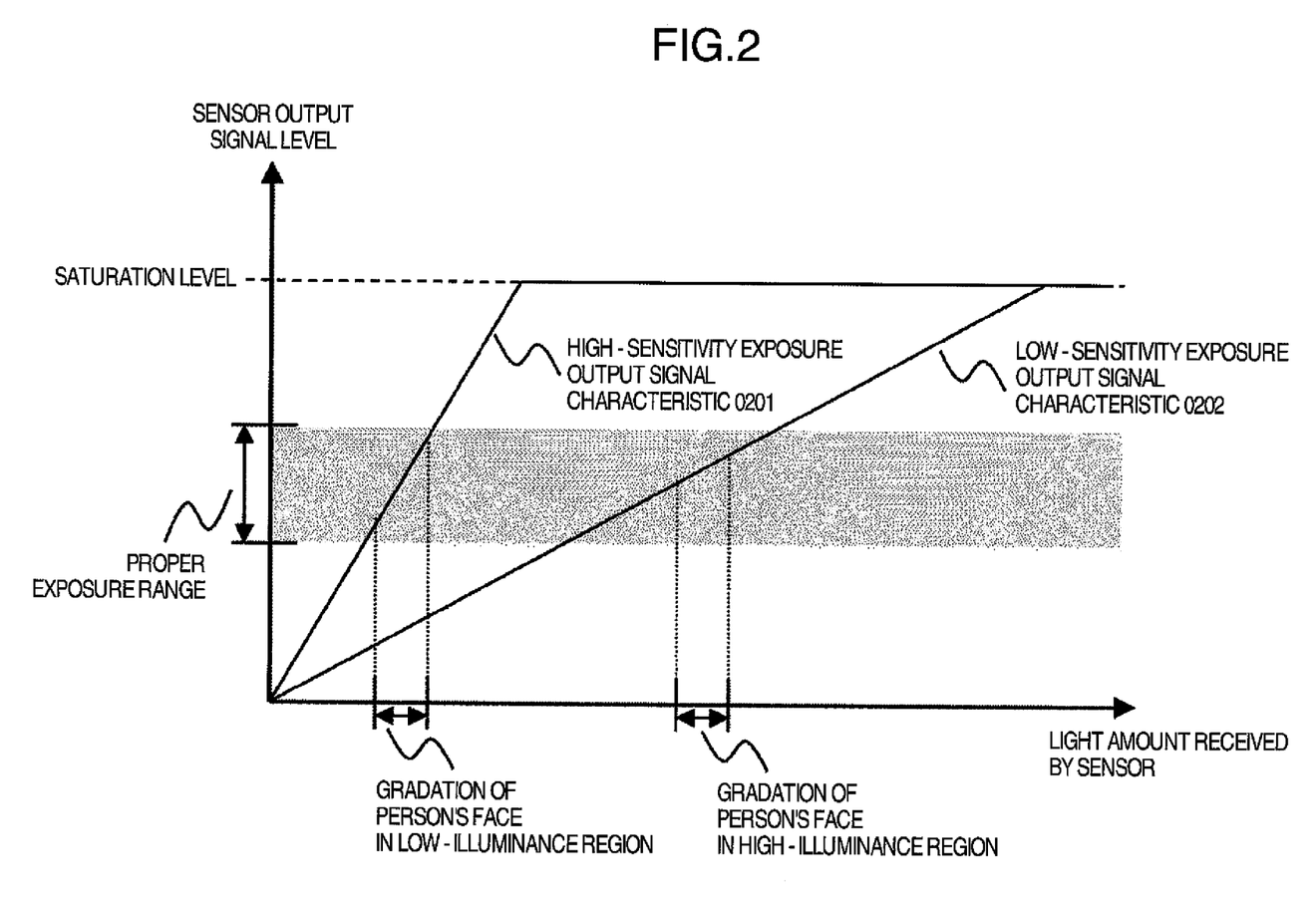
FIG. 2 is a diagram showing an example of the exposure control operation according to the first embodiment of the invention.

FIG. 2 is a diagram showing an example of the exposure control operation according to the first embodiment of the invention. The exposure control operation shown in FIG. 2 is executed by the exposure control unit 0102. In FIG. 2, the abscissa represents the amount of light that has entered the sensor, and the ordinate the signal level output from the sensor. Numeral 0201 designates the output signal characteristic for high-sensitivity exposure, and numeral 0202 the output signal characteristic for low-sensitivity exposure. In this case, assume that a person exists in each of the low-illuminance region and the high-illuminance region of the scene to be imaged. The object recognition unit 0105 detects the face of the person as an intended object and determines the brightness distribution of the face area. Then, the exposure control unit 0102 operates in such a manner that the exposure of the face area approaches the proper exposure range, in the high-sensitivity exposure control, based on the brightness distribution of the face area of the person existing in the low-illuminance region, and the proper exposure range, in the low-sensitivity exposure control, based on the brightness distribution of the face area of the person existing in the high-illuminance region. This process is repeated for each exposure period until the high-sensitivity exposure and the low-sensitivity exposure can finally assume a value in the vicinity of the proper exposure range, respectively. In the case where a plurality of faces can be detected in at least one of the low- and high-illuminance regions, the gravity center of the brightness of the plurality of the faces is determined and the exposure at the gravity center is caused to assume a value as near to the proper exposure range as possible. At the same time that the gravity center of the brightness is determined, the information on the position of the detected face image may be acquired, and by increasing the weight of the face near the center of the image while at the same time decreasing the weight of the surrounding faces, the exposure of the object near the center of the image may be set to the proper exposure in priority. As a result, the exposure of both the faces of the persons in low- and high-illuminance regions can be properly controlled, and a wide dynamic range with an improved visibility can be realized. Incidentally, in the case where the scene to be imaged has a very large contrast of brightness, the face of the person in the low- or high-illuminance region is liable to be poorly imaged in details and fail to be successfully detected by image recognition. As the initial process, therefore, the brightness distribution over the whole scene is acquired, and based on this information, the high- and low-sensitivity exposure may be controlled to eliminate the loss-of-detail in the lowlight and the highlight saturation with white in the image, respectively, followed by visual recognition of the object. Also, in the case where no person exists in at least one of the low- and high-illuminance regions of the imaged scene, the exposure is controlled similarly by utilizing the brightness distribution information for the whole scene. Further, in the case where the exposure control amount is determined only by the brightness distribution of the face area, the areas other than the face may result in the loss-of-detail in the lowlight and the highlight saturation with white in the image. To prevent the phenomena of the loss-of-detail in the lowlight and the highlight saturation with white in the image, the overall exposure control amount may be determined by combining, while weighting, the exposure control amount based on the brightness distribution of the face area with the exposure control amount based on the brightness distribution of the whole scene.

Figure 3:
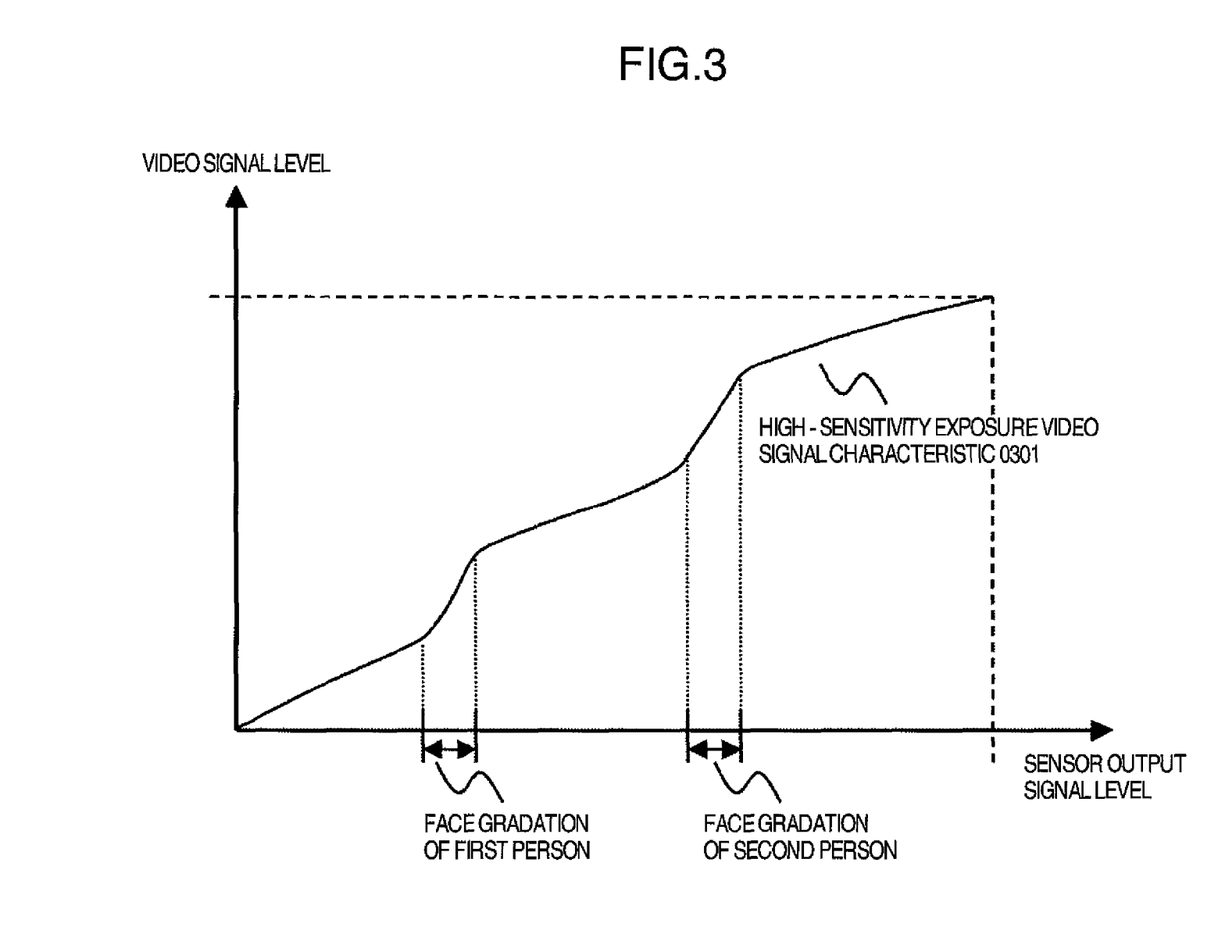
FIG. 3 is a diagram showing an example of the gamma characteristic control operation according to the first embodiment of the invention.

FIG. 3 is a diagram showing an example of the control of the gamma characteristic according to a first embodiment of the invention. The control of the gamma characteristic shown in FIG. 3 is executed by the camera signal processing unit 0103. In FIG. 3, the abscissa represents the signal level output from the sensor, and the ordinate the video signal level after brightness correction. Numeral 0301 designates the video signal characteristic with high-sensitivity exposure. In this example, assume that two persons exist in the low-illuminance region of the imaged scene. In the gamma characteristic control, the gamma process is not executed on the assumption of the normal gamma curve, but the nonlinear signal characteristic conversion process is executed so that the face of the persons may secure a wide gradation in the video signal as shown in FIG. 3. By highlighting the gradation of the face of the persons on the image in this way, a wide dynamic range thereof is realized with an improved visibility. Incidentally, although the gamma characteristic control for the high-sensitivity exposure is explained above, a similar process may be executed also for the low-sensitivity exposure.

Figure 4A:
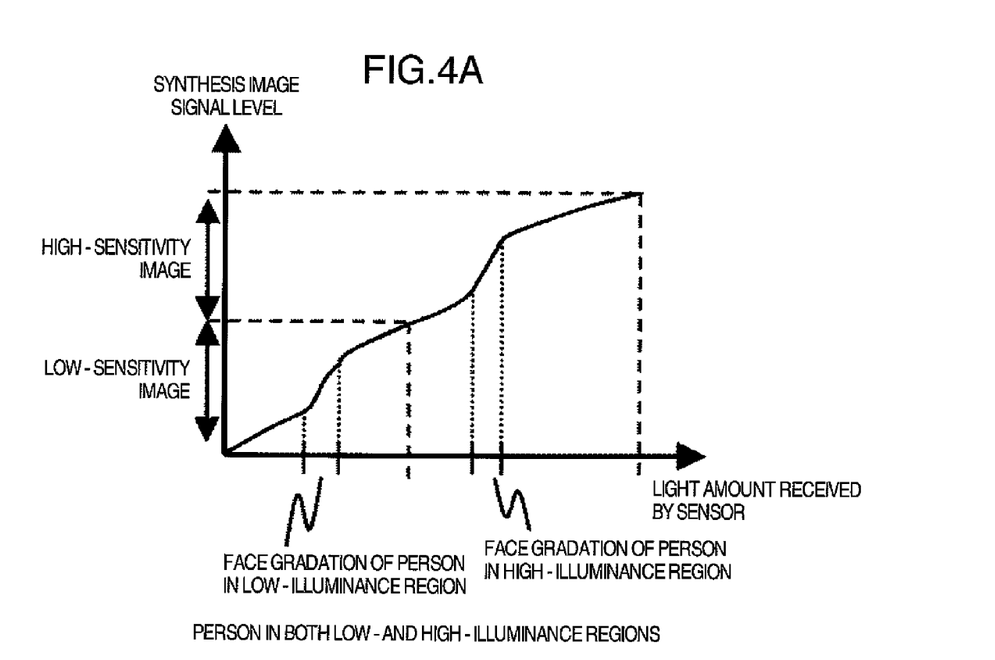
FIGS. 4A and 4B are diagrams showing an example of the video synthesis control operation according to the first embodiment of the invention.
Figure 4B:
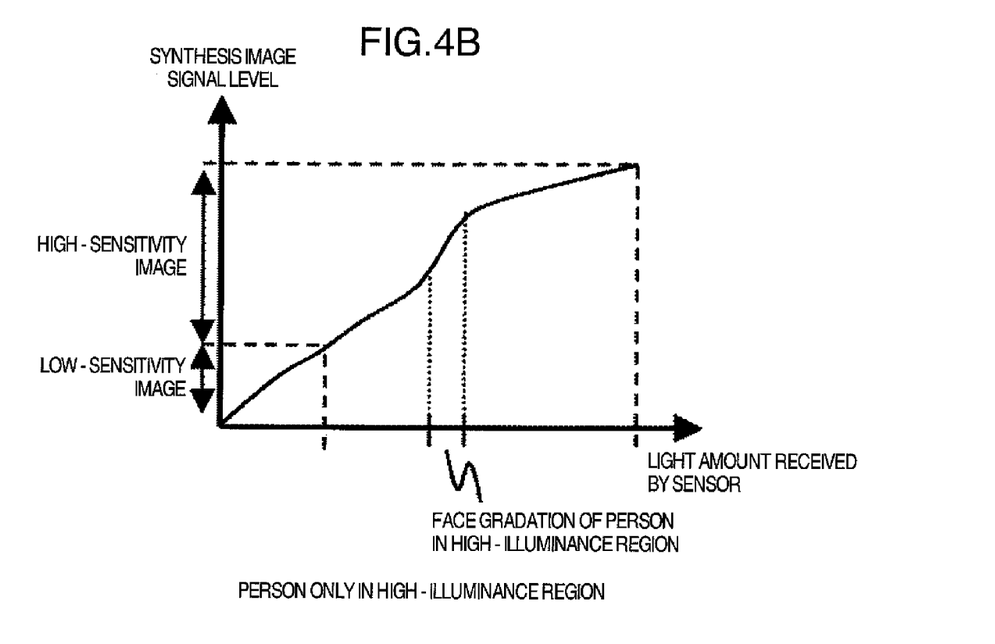

FIGS. 4A and 4B are diagrams showing an example of the video synthesis control according to the first embodiment of the invention. The video synthesis control shown in FIGS. 4A and 4B is executed by the video synthesis unit 0104. FIG. 4A shows an example of the synthesis control executed with a person existing in both the high- and low-illuminance regions, and FIG. 4B an example of the synthesis control executed with a person existing only in the high-illuminance region of the imaged scene. In the video synthesis unit 0104, the video signal obtained with high-sensitivity exposure and the video signal obtained with low-sensitivity exposure are synthesized with each other at a predetermined ratio, and the synthesis result is output. In this video synthesis control operation, the number of faces detected by the object detection unit 0105 in the low- and high-illuminance regions of the imaged scene, and in accordance with this number of faces, the synthesis ratio is controlled. The synthesis ratio may be determined only by the number of faces or, alternatively, in combination by weighting other information such as the areal ratio between the object exposed properly at high sensitivity and the object exposed properly at low sensitivity. In the case where faces appear in both high- and low sensitivity images, for example, as shown in FIG. 4A, the synthesis ratio is determined from the areal ratio between the objects properly exposed, while in the case the face appears only in one image, on the other hand, the addition ratio for synthesis of the particular image is set slightly larger as shown in FIG. 4B. As a result, only the image having the face of the person is highlighted and a wide dynamic range with an improved visibility can be realized. In the process, the addition ratio may be changed by further weighting based on the information such as the reliability of the detected face. As another alternative, the ratio may be changed based on the ratio of the number of the detected faces as well as the presence or absence of a face in each image. In other words, the addition ratio for the low-sensitivity image may be increased in the presence of one face in the low-illuminance region and two faces in the high-illuminance region.

In FIG. 2 to FIGS. 4A, 4B, each example of the control operation is explained using the face of persons as an object detected by the object recognition unit 0105. A similar control is possible, however, for any detection object such as the whole image of a person, a moving object or a vehicle that can be detected by image recognition. The object to be detected can be determined in accordance with the target of each application. Also, a plurality of objects may be recognized at the same time.

Also, in each control operation shown in FIGS. 4A, 4B, different object recognition results may be used. The exposure control unit 0102 detects a moving object as an intended object, for example, and controls a walking person to proper exposure on the one hand, while the camera signal processing unit 0103 controls the gamma characteristic to secure the gradations of the faces of both the walking person and the stationary person using the result of the face recognition of the persons on the other hand.

Figure 5:
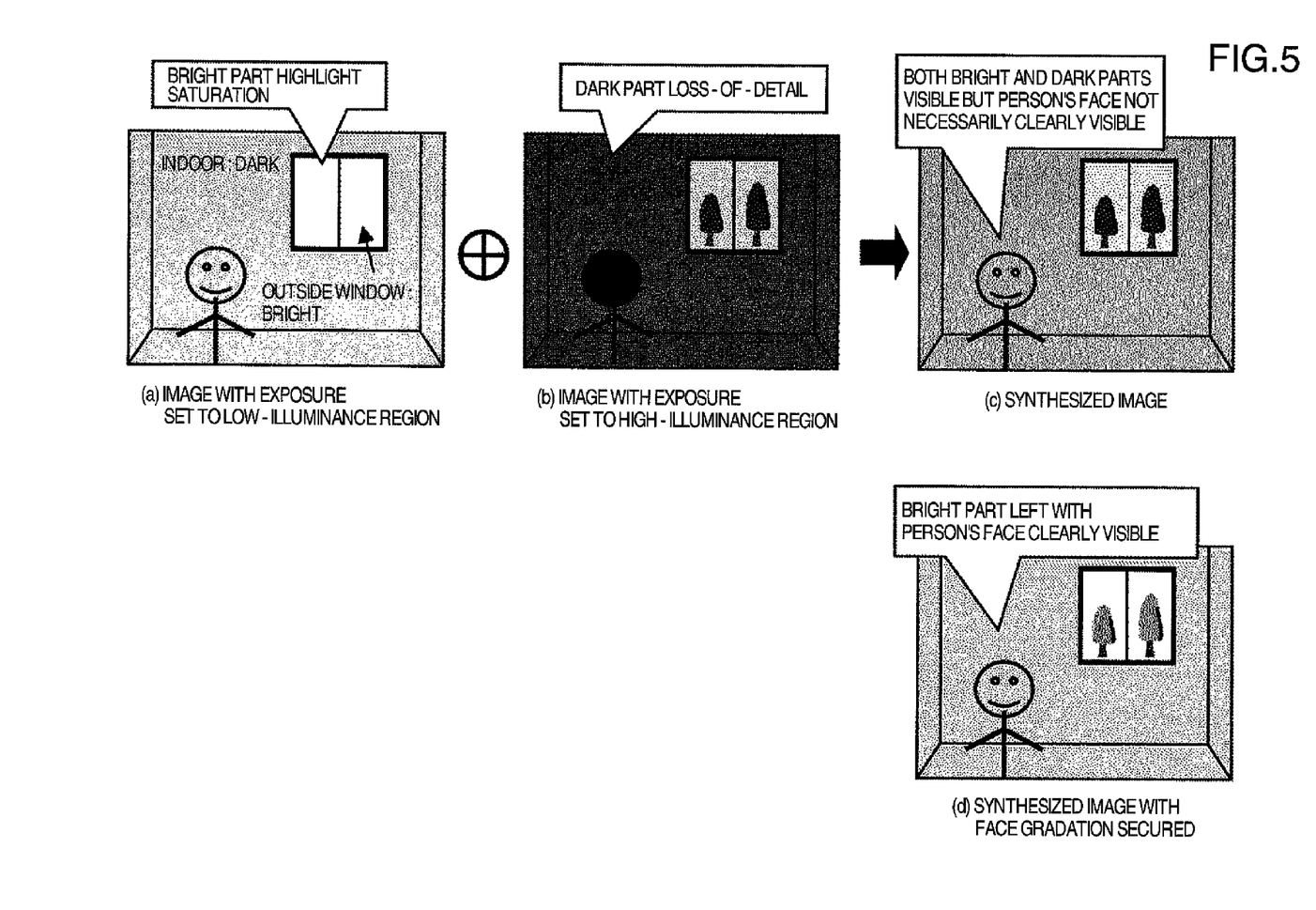
FIG. 5 is a diagram showing an example of the advantage of the process executed to secure a wide dynamic range according to the first embodiment of the invention.

FIG. 5 is a diagram showing an example of the effect of the process to secure a wide dynamic range according to the first embodiment of the invention. In FIG. 5, (a) shows an image with the exposure set to the low-illuminance region in the imaged scene, (b) an image with the exposure set to the high-illuminance region in the image scene, (c) an synthesized image with the images (a) and (b) added at a predetermined ratio in the existing process to secure a wide dynamic range, and (d) an synthesized image with the face gradation secured by each control shown in FIGS. 2 to 4. As shown in (c) of FIG. 5, the existing function to secure a wide dynamic range, though capable of generating an image free of the loss-of-detail in the lowlight and the highlight saturation with white in the image, fails to take the face brightness distribution into consideration, and therefore, has a low visibility of the face. In (d) of FIG. 5, on the other hand, the face brightness distribution is taken into consideration and the face gradations are secured in priority, and therefore, the visibility of the face is improved while retaining the bright image portion which is liable to be suffered from the highlight saturation with white in the image.

As described above, according to this embodiment, the synthesis of a plurality of images picked up with different sensitivities realizes the function to secure a wide dynamic range, in which the phenomena of the loss-of-detail in the lowlight and the highlight saturation with white in the image which otherwise might be caused in the imaging operation of a high-contrast scene is suppressed by enlarging the dynamic range on the one hand, and the visibility is improved by preferentially securing the gradations of a specified object as desired by the user on the other hand.

Second Embodiment

Figure 6:
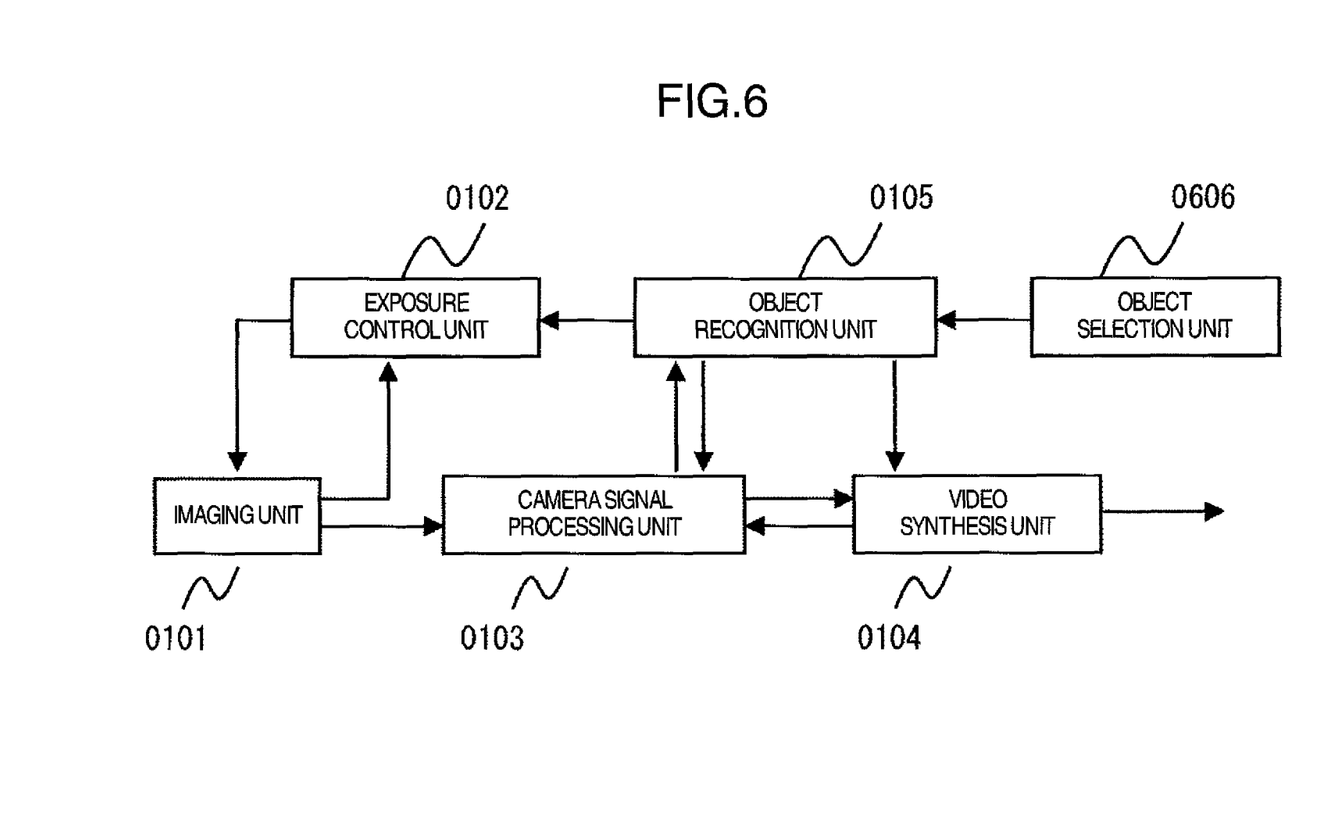
FIG. 6 is a schematic diagram showing an imaging apparatus according to a second embodiment of the invention.

FIG. 6 is a schematic diagram showing the imaging apparatus according to the second embodiment of the invention. In FIG. 6, numeral 0101 designates an imaging unit, numeral 0102 an exposure control unit, numeral 0103 a camera signal processing unit, numeral 0104 a video synthesis unit, numeral 0105 an object recognition unit and numeral 0606 an object selection unit.

In the imaging apparatus shown in FIG. 6, the imaging unit 0101, the exposure control unit 0102, the camera signal processing unit 0103, the video synthesis unit 0104 and the object recognition unit 0105 have similar functions to the corresponding parts, respectively, of the first embodiment. The object selection unit 0606, including a user input device such as a jog dial, a cursor key or a touch panel, determines the type of the intended object recognized by the user through the object recognition unit 0105.

Figure 7A:
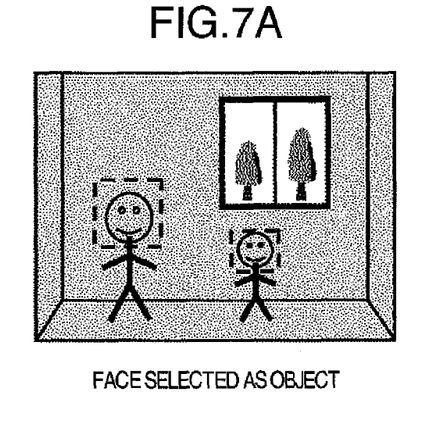
FIGS. 7A to 7C are diagrams showing an example of the object selection method according to the second embodiment of the invention.
Figure 7B:
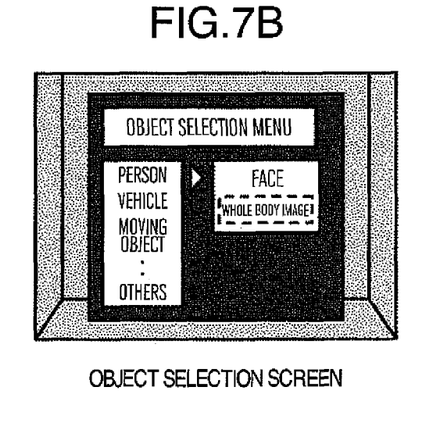
Figure 7C:
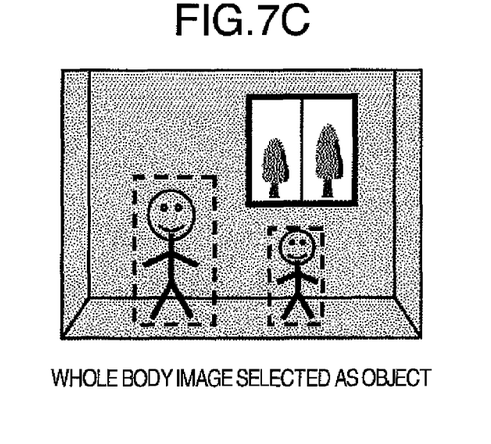

FIGS. 7A to 7C are diagrams showing an example of the object selection method according to the second embodiment. FIG. 7A shows an image picked up with the faces selected as an object, FIG. 7B a screen with a menu open on the LCD or the like to enable the user to select the object detected by the object selection unit 0606, and FIG. 7C an image picked up with the whole image selected as an object. In FIGS. 7A and 7C, the frames defined by dotted lines indicate the object detection result for convenience sake.

As described above, according to this embodiment, the intended object to be recognized by the object recognition unit 0105 can be changed easily by the user using the object selection unit 0606. Specifically, in accordance with the object which the user is desirous of watching, the wide dynamic range can be easily switched in such a manner that the visibility of the face of a person to be imaged indoor is improved on some occasion, while the visibility of an automobile to be imaged on the road outdoor is improved on another occasion.

Third Embodiment

Figure 8:
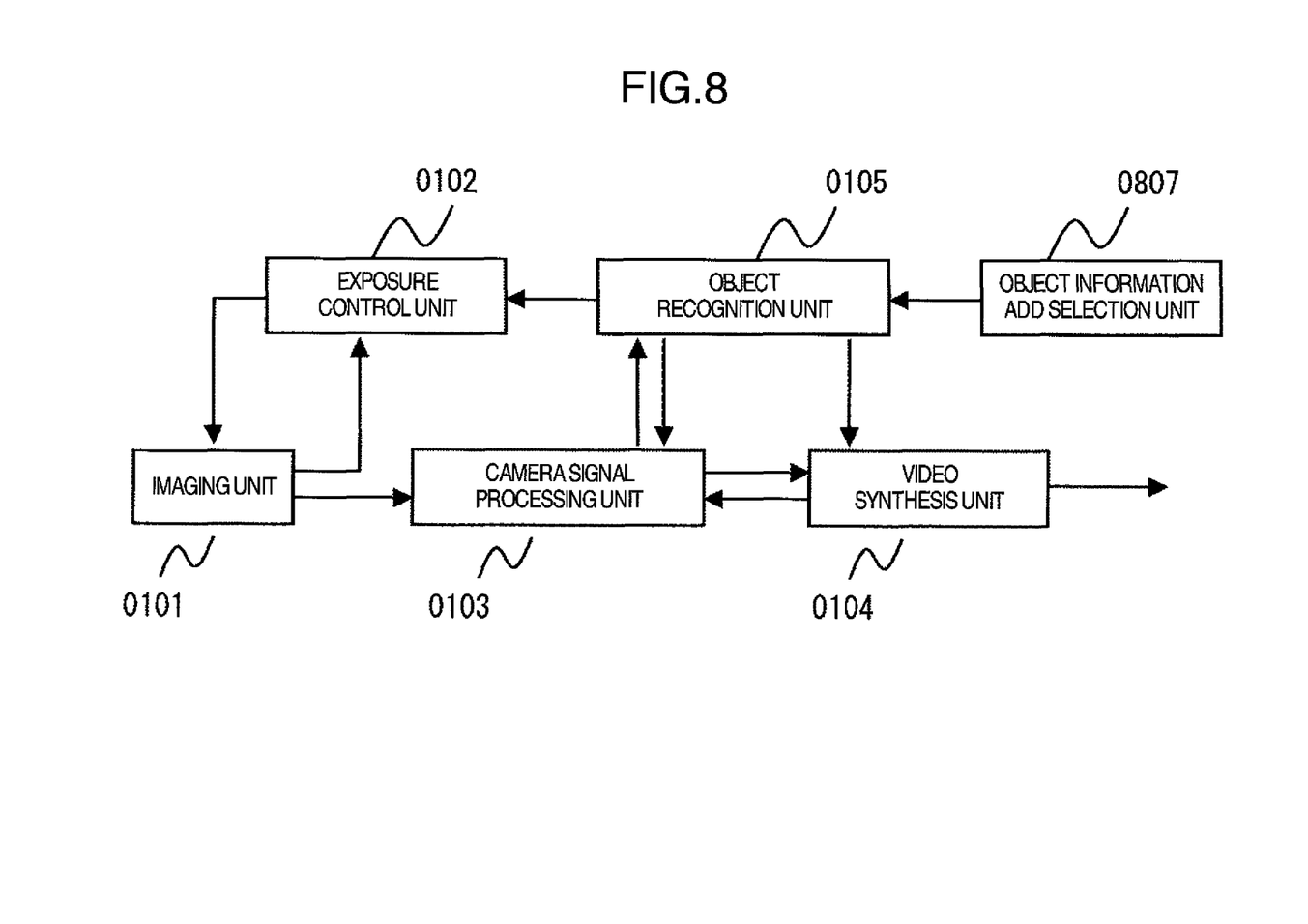
FIG. 8 is a schematic diagram showing an imaging apparatus according to a third embodiment of the invention.

FIG. 8 is a schematic diagram showing the imaging apparatus according to the third embodiment of the invention. In FIG. 8, numeral 0101 designates an imaging unit, numeral 0102 an exposure control unit, numeral 0103 a camera signal processing unit, numeral 0104 a video synthesis unit, numeral 0105 an object recognition unit and numeral 0807 an object information add selection unit.

In the imaging apparatus shown in FIG. 8, the imaging unit 0101, the exposure control unit 0102, the camera signal processing unit 0103, the video synthesis unit 0104 and the object recognition unit 0105 have similar functions to the corresponding parts, respectively, of the first embodiment. The object information add selection unit 0807, which includes a user input device such as a jog dial, a cursor key or a touch panel, enables the user to determine whether the information on the object recognition result is to be added or not to the synthesized image generated by the video synthesis unit 0104. In the case where the user decides to add the information on the object recognition result, the video synthesis unit 0104 adds, as a part of the synthesis operation, the information on the object recognition result including the position, the quantity or the reliability of the detected object in the form of a figure or a character to the synthesized image.

Figure 9A:
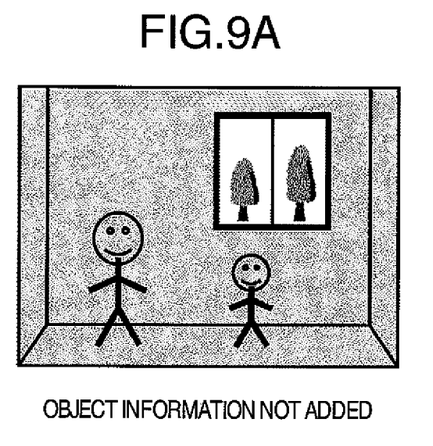
FIGS. 9A and 9B are diagrams showing an example of the control operation for adding the object information to the synthesized image of the object recognition result according to the third embodiment of the invention.
Figure 9B:
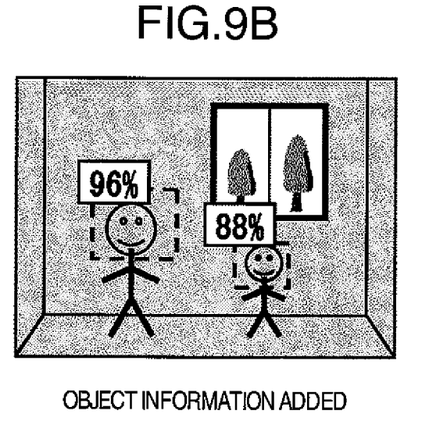

FIGS. 9A and 9B are diagrams showing an example of the addition of the object recognition result to the synthesized image according to the third embodiment. FIG. 9A shows an output image with the object information not added, and FIG. 9B an output image with the object information added. The example shown here represents a case in which the object recognition unit 0105 detects the faces of persons as an intended object and in which the position of each detected face is defined by a dotted square and the reliability of detection by a character.

As described above, according to this embodiment, the information on the object recognition result is added to the synthesized image generated by the function to secure a wide dynamic range, so that the degree to which the user could recognize the object can be confirmed. This information can be used as a reference for the operation or fed back to the maker in the case where the functions fail to work well.

Preferred embodiments of the invention are described above with the accompanying drawings. According to this invention, the dynamic range of the digital video camera or the still camera is enlarged to suppress the phenomena of the loss-of-detail in the lowlight and the highlight saturation with white in the image in picking up an image of a scene high in difference between highlight and lowlight. At the same time, the visibility can be improved by enlarging the gradations of any part of the object specified by the user in priority.

Incidentally, this invention is not limited to the embodiments described above, but includes various modifications. The aforementioned embodiments, for example, are described in detail to facilitate the understanding of the invention, and the invention is not necessarily confined to the embodiments having the entire configuration described. Also, a part of the configuration of a given embodiment can be replaced by the corresponding part of the configuration of another embodiment. Further, the configuration of a given embodiment can be added to the configuration of another embodiment.

This invention is applicable to the digital video cameras and still cameras for home use, monitoring, on-vehicle use and business.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An imaging apparatus comprising:
an imaging unit;
a camera signal processing unit which generates a video signal by processing a camera signal output from the imaging unit;
an exposure control unit which realizes a plurality of the imaging operations of the same object with different sensitivities by controlling the exposure of the imaging unit;
a video synthesis unit which outputs by synthesizing a plurality of video signals having different sensitivities imaged by the imaging unit under an exposure control performed by the exposure control unit and generated by the camera signal processing unit; and an object recognition unit which detects the object information by the image processing of the video signals generated by the camera signal processing unit;

wherein the object recognition unit detects the object information for each of the plurality of the video signals having different sensitivities generated by the camera signal processing unit, and the exposure control unit uses the object information for exposure control;

wherein the exposure control unit controls and changes an exposure amount based on the detected object information;

wherein the video synthesis unit outputs by synthesizing a plurality of video signals having different sensitivities generated by the camera signal processing unit, under an exposure control performed by the exposure control unit changed based on the object information;

wherein the object recognition unit detects a plurality of types of object information at the time of detecting the object information for each of a plurality of video signals having different sensitivities generated by the camera signal processing unit, and wherein at least two of a control of the exposure control amount based on the object information performed by the exposure control unit, a control of the gamma characteristic of the video signals based on the object information performed by the camera signal processing unit, and a control of a ratio at which the plurality of the video signals having different sensitivities are synthesized performed by the video synthesis unit are performed by using the result of recognition of respectively different types of object information.

2. The imaging apparatus according to claim 1, wherein the object recognition unit detects the object information for each of a plurality of video signals having different sensitivities generated by the camera signal processing unit, and based on the object information, the camera signal processing unit changes the gamma characteristic of the video signals.

3. The imaging apparatus according to claim 2, wherein the object recognition unit detects the object information for each of a plurality of video signals having different sensitivities generated by the camera signal processing unit, and based on the object information, the video synthesis unit changes the ratio at which the plurality of the video signals having different sensitivities are synthesized.

4. The imaging apparatus according to claim 1, further comprising an object selection unit which causes the user to select the types of the objects detected by the object recognition unit.

5. The imaging apparatus according to claim 4, wherein the video synthesis unit outputs by adding the object information detected by the object recognition unit to the synthesized image.

6. The imaging apparatus according to claim 5, further comprising an object information add selection unit which causes the user to determine whether the object information is added to the image synthesized by the video synthesis unit.

7. The imaging apparatus according to claim 1, wherein the object recognition unit detects the object information for each of a plurality of video signals having different sensitivities generated by the camera signal processing unit, and based on the object information, the video synthesis unit changes the ratio at which the plurality of the video signals having different sensitivities are synthesized.

8. The imaging apparatus according to claim 7, wherein the object recognition unit detects a plurality of types of objects at the time of detecting the object information for each of a plurality of video signals having different sensitivities generated by the camera signal processing unit, and wherein based on the object information and using the result of recognition of different objects, the exposure control unit changes the exposure control amount, the camera signal processing unit changes the gamma characteristic of the video signals, and the video synthesis unit changes the ratio at which the plurality of the video signals having different sensitivities are synthesized.

9. The imaging apparatus according to claim 8, further comprising an object selection unit causing the user to select the types of the objects detected by the object recognition unit.

10. The imaging apparatus according to claim 9, wherein the video synthesis unit outputs by adding to the synthesized image the object information detected by the object recognition unit.

11. The imaging apparatus according to claim 10, further comprising an object information add selection unit which causes the user to determine whether the object information is added to the image synthesized by the video synthesis unit.

12. The imaging apparatus according to claim 1, wherein the object recognition unit detects a plurality of types of objects at the time of detecting the object information for each of a plurality of video signals having different sensitivities generated by the camera signal processing unit, and wherein based on the object information and using the result of recognition of different objects, the exposure control unit changes the exposure control amount, the camera signal processing unit changes the gamma characteristic of the video signals, and the video synthesis unit changes the ratio at which the plurality of the video signals having different sensitivities are synthesized.

13. The imaging apparatus according to claim 12, further comprising an object selection unit which causes the user to select the types of the objects detected by the object recognition unit.

14. The imaging apparatus according to claim 13, wherein the video synthesis unit outputs by adding the object information detected by the object recognition unit to the synthesized image.

15. The imaging apparatus according to claim 14, further comprising an object information add selection unit which causes the user to determine whether the object information is added to the image synthesized by the video synthesis unit.

16. The imaging apparatus according to claim 1, further comprising an object selection unit which causes the user to select the types of the objects detected by the object recognition unit.

17. The imaging apparatus according to claim 16, wherein the video synthesis unit outputs by adding the object information detected by the object recognition unit to the synthesized image.

18. The imaging apparatus according to claim 17, further comprising an object information add selection unit which causes the user to determine whether the object information is added to the image synthesized by the video synthesis unit.

19. The imaging apparatus according to claim 1,
wherein the video synthesis unit outputs by adding the object information detected by the object recognition unit to the synthesized image.

20. The imaging apparatus according to claim 19, further comprising an object information add selection unit which causes the user to determine whether the object information is added to the image synthesized by the video synthesis unit.

* * * * *